May 15, 1923.
E. L. STANGELAND
GENERATOR
Filed April 20, 1922
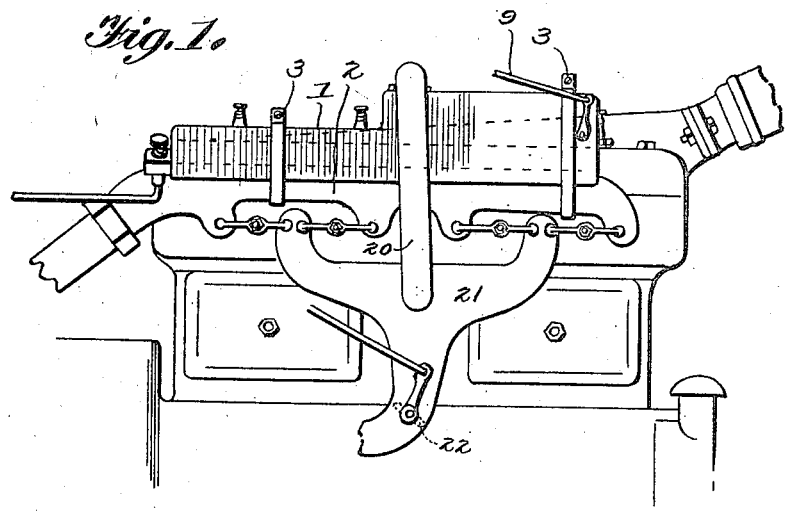
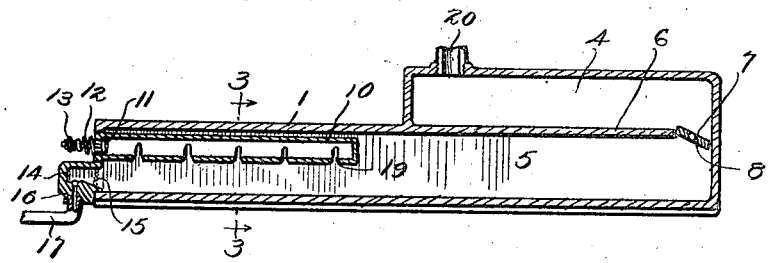
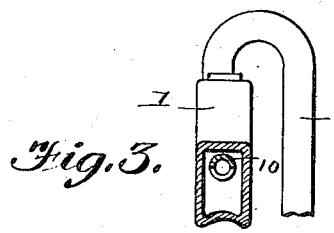
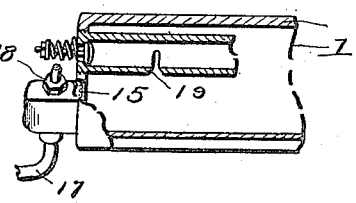
INVENTOR.
E. L. Stangeland.
Attorney Patented May 15, 1923.

1,455,275

UNITED STATES PATENT OFFICE.

ERIC L. STANGELAND, OF EAST STANWOOD, WASHINGTON.

GENERATOR.

Application filed April 20, 1922. Serial No. 555,755.

*To all whom it may concern:*

Be it known that ERIC L. STANGELAND, a citizen of the United States of America, residing at East Stanwood, in the county of King and State of Washington, has invented certain new and useful Improvements in Generators, of which the following is a specification.

The invention relates to a vaporizer attachment for explosive engines, in the use of which the gasoline or other fuel is directly vaporized by the heat of the exhaust pipe, mixed with a proper quantity of air under the suction stroke of the piston, and delivered to the intake manifold through a controllable means, as a throttle valve.

The invention is designed to be used as a substitute for the ordinary carbureter, though contemplating the initial use of the latter, in the usual manner, for starting purposes. As soon as the exhaust pipe becomes heated, the improved carbureter or vaporizer is designed solely for use in connection with supplying the engine with fuel, and in such use, avoids the possibility of feeding any raw fuel or liquid fuel to the cylinders.

In the drawings:

Fig. 1 is a view in elevation showing my improved vaporizer attached to an engine.

Fig. 2 is a vertical sectional view through the vaporizer.

Fig. 3 is a section on line 3—3 of Fig. 2.

Fig. 4 is an enlarged sectional view, partly in elevation, showing the gas and air inlets to the vaporizer.

The improved vaporizer comprises an elongated tank 1, adapted to be secured directly on and in contact with the usual exhaust pipe 2, through the use of clips 3. One end of this tank, hereinafter termed the forward end, is of increased height, the increased portion providing a chamber 4, divided from the interior or chamber 5 of the main tank 1 by a partition 6. The partition is formed with an opening 7, whereby the respective chambers 4 and 5 may communicate, a valve 8, of the usual throttle valve type, and controlled from the dash or otherwise, by the throttle connection 9, controls the size of the opening 7, and so governs the quantity of fuel passing from the chamber 5 to the chamber 4.

An air pipe 10 is arranged in the chamber 5 opening through the rear wall of the tank 1 near the upper end of said wall, this pipe 10 being controlled by an inwardly opening valve 11 normally closed by a spring 12, and regulatable as to the extent of opening by a nut 13. A gasoline bowl 14 is arranged below the air inlet and opens to the chamber 5 through an opening protected by a screen 15. A needle valve 16 controls the admission of gasoline or other fuel from a suitable source through a pipe 17 to the bowl 14, this needle valve being preferably regulatable by any usual or preferred means, such for example, as indicated at 18. The air pipe 10 immediately above the inlet of fuel, is formed with a series of elongated slots or outlets 19, so that the incoming air is directed downwardly on to the fuel passing through the screen.

A feed pipe 20 extends from the upper wall of the increased height portion of the tank 1, said pipe having thus free communication with the chamber 4, preferably remote from the opening 7. The pipe 20 curves downwardly in front of the tank and leads into the usual intake manifold 21. The intake manifold is here shown as of the usual type, governed by a throttle valve 22, and designed for connection with the usual carbureter (not shown), it being obvious that with the throttle valve 8 closed and the throttle valve 22 open, the engine will be supplied by fuel in the usual manner, as will be found desirable for starting purposes.

Following the heating of the exhaust pipe 2, through which the bottom wall of the tank 1, as well as the interior of this tank becomes more or less highly heated, the throttle valve 22 may be closed, and the throttle valve 8 open in accordance with the engine speed desired. The engine suction draws fuel from the bowl 14 on to and lengthwise the bottom of the tank 1, where the fuel is quickly vaporized. The engine suction also draws in air through the pipe 10, to the extent permitted by the adjusted position of the air valve 11, and this air is drawn onto the fuel and mixed therewith. The vapor, continually undergoing mixing, by its travel lengthwise the chambers 5 and 4, is delivered to the intake 21, and thence to the cylinders.

Owing to the length of travel of the fuel in contact with the highly heated bottom of the tank 1, it is apparent that all gasoline must necessarily be converted into vapor, and owing to the fact that the chamber 4 is located above the chamber 5, it is apparent that no raw gasoline can be drawn into the intake manifold,

Claims:

1. A vaporizer for gasoline engines, including a tank having a bottom wall adapted to be heated by the exhaust pipe of the engine, means for delivering fuel to the tank at one end of said bottom wall, means for delivering air to the tank, a chamber arranged above the tank and having valve communication therewith, and a feed pipe leading from said chamber to the intake manifold.

2. A vaporizer for gasoline engines, comprising an elongated tank having its bottom wall resting directly upon the exhaust pipe of the engine, means for admitting fuel at one end of the tank immediately above said bottom wall, means for admitting air at the same end of the tank above the fuel inlet, a chamber arranged above the tank remote from the fuel inlet and closed against the tank except for a single opening, a valve controlling said opening, and a feed pipe leading from said chamber to the intake manifold.

3. A vaporizer for gasoline engines, including an elongated tank having its bottom wall resting directly upon the exhaust pipe of the engine, means for admitting fuel at one end of the tank immediately above said bottom wall, a valve controlled inlet arranged above the fuel inlet, a pipe arranged in said tank and having communication with said valve controlled inlet and formed with outlets directed toward the bottom of the tank, a chamber arranged above the tank remote from the fuel inlet and having valve controlled communication with the tank, and a feed pipe leading from said chamber to the intake manifold.

In testimony whereof I affix my signature.

ERIC L. STANGELAND.